United States Patent Office 3,459,117
Patented Aug. 5, 1969

3,459,117
COVER FOR TREATING FRESH RED MEAT
WITH CARBON MONOXIDE
Walter T. Koch, Havertown, and Frank E. Carevic, West Chester, Pa., assignors to FMC Corporation, Philadelphia, Pa., a corporation of Delaware
Filed July 21, 1967, Ser. No. 655,184
Int. Cl. A23b 1/00; A23l 3/34; B65d 85/70
U.S. Cl. 99—254                                    5 Claims

ABSTRACT OF THE DISCLOSURE

For treating fresh red meat with carbon monoxide to produce a slow oxidizing carboxymyoglobin color, a supply of carbon monoxide is sealed between a pair of flexible films which are substantially carbon monoxide impermeable when dry and one of which becomes carbon monoxide permeable when wet whereby the gas is released through the last mentioned film so as to contact the meat when said film is placed in contact with the meat.

---

This invention relates to a cover useful for treating fresh red meat with carbon monoxide and more particularly to a cover which when placed in contact with an exposed surface of fresh red meat releases carbon monoxide into contact with the meat whereby the meat takes on a bright red carboxymyoblobin color.

The constituent of red meat responsible for its color is myoglobin or muscle hemoglobin. Myoglobin contains iron in the ferrous state and when a freshly cut surface of red meat, e.g. beef, is exposed to air, oxygen in the air loosely combines with the iron to convert myoglobin to oxymyoglobin which has the bright red color making the meat attractive for sale. This conversion of myoglobin to oxymyoglobin takes place quite quickly, that is, within half an hour and the process is generally referred to as "blooming." In oxymyoglobin the iron is still in the ferrous state, that is, no oxidation has taken place but only oxygenation. Upon continued exposure to oxygen, the iron gradually but within a relatively short time becomes oxidized to the ferric state to produce metmyoglobin and the exposed surface of the meat becomes dark brown or gray and is generally considered unattractive. In order to preserve the bloom, that is to prevent or at least retard the conversion of oxymyoglobin to metmyoglobin, a variety of wrappers or covers have been employed but the best of them are effective in retaining the oxymyglobin color for only two or three days.

Beef is frequently slaughtered at a place remote from the point of sale to the eventual consumer. At the slaughterhouse, the animal is dressed and cut into halves or sometimes into quarters which are forwarded to the retail outlet where they are further divided into primal cuts and then into steaks, roasts, etc. It may be a matter of six or seven days between the time the halves or quarters are cut and the time they reach the retail outlet. When the meat is in the form of a quarter or a half, very little of the red meat is exposed and color change is not a serious problem. It would be desirable to have the primal cuts prepared at the slaughterhouse but so far this has not been economically feasible due to the fact that the exposed ends of the primal cuts would take on the unattractive metmyoglobin color during the extended cycle of delivery. Contrary perhaps to popular belief, beef is a relatively low profit commodity and neither the retailer nor the wholesaler can well afford to sacrifice the ends of a primal cut of beef by making a fresh cut in order to obtain a saleable color for the end steaks or roasts.

It is known that when freshly cut beef is exposed to carbon monoxide, the carbon monoxide combines with the ferrous iron of the myoglobin to form carboxymyoglobin. Carboxymyoglobin is substantially the same color as oxymyoglobin but is a much more stable compound and the iron oxidizes to the ferric state only after a considerable number of days exposure of the meat to oxygen. Thus, it would be practicable to have the primal cuts prepared at the slaughterhouse and within the normal delivery cycle of six or seven days deliver them to the retail if there were a convenient way of subjecting the ends of the primal cuts to carbon monoxide within a reasonable time after cutting. It would be even more desirable to keep the ends of the primal cuts in contact with the gas during at least a part of the shipping cycle. However, carbon monoxide is a poisonous gas and heretofore there has been no convenient and safe way of using it for this purpose.

It is an object of this invention to provide a cover or wrapper having confined therein a relatively small quantity of carbon monoxide which is gradually released into contact with the surface of freshly cut meat when the wrapper is placed against or around the meat.

Other and further objects, features and advantages of the invention will become apparent as the description of certain preferred embodiments thereof proceeds.

Referring now to the drawing.

Figure 1:
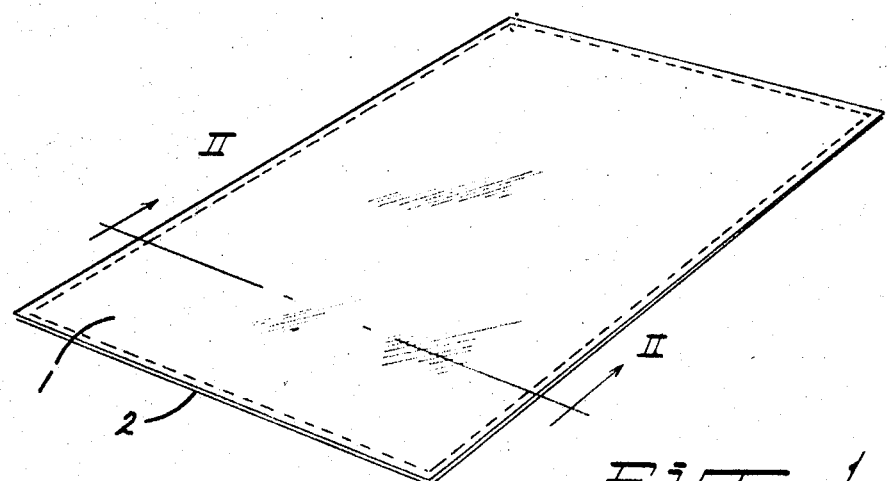
FIG. 1 is a perspective view of the cover in the form of a sheet.
Figure 2:
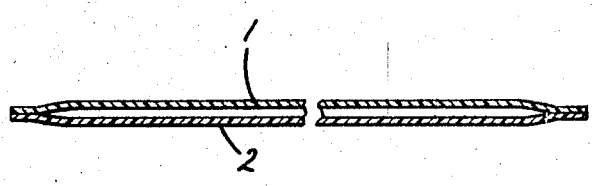
FIG. 2 is a section taken along the line II—II of FIG. 1.

The cover shown in FIGS. 1 and 2 comprises a first flexible, preferably transparent film 1 and a second flexible, preferably transparent film 2. The two films are sealed together around the edges and a relatively small quantity of carbon monoxide gas is confined therebetween. Both films are substantially carbon monoxide impermeable when dry whereby the cover may be safely stored for a substantial period without loss of the gas. However, at least one of the films and preferably only one is hydrophylic and becomes carbon monoxide permeable when wet. For the sake of convenience, the film 1 will be considered to be the hydrophylic film. Film 1 is preferably regenerated cellulose or cellophane and is preferably provided on the side facing film 2 with a permeable, heat sealable coating such as polyethylene. Film 2 is preferably hydrophonic and carbon monoxide impermeable both when dry and when wet. Film 2 may for example be saran coated with polyethylene on the side facing film 1 whereby the two films may be sealed together around the edges by a heat seal.

Film 2 may actually be a hydrophylic film which is coated on both sides with a hydrophobic material; for example, film 2 may be cellophane coated on both sides with saran and then further coated on the side facing film 1 with polyethylene whereby an efficient heat seal may be obtained between the two films.

It is not essential that the two films be heat sealable inasmuch as they may be secured together around the edges in an airtight manner by other means, e.g. an adhesive.

When film 1 is brought into contact with a freshly cut surface of red meat, the moisture in the meat wets the film and transforms the same into a carbon monoxide permeable structure. Thereupon, the carbon monoxide begins to escape through the film 1 and into contact with the meat to produce the desirable and long lasting carboxymyoglobin color. Suitable indicia may be provided either on film 1 or film 2 to inform the butcher as to which surface is to be placed against the meat.

It is contemplated that the primary use for the cover shown in FIGS. 1 and 2 will be to cover the ends of primal cuts made at a slaughterhouse. When the primal cuts arrive at the retail outlet, the covers are removed and the meat is cut into individual steaks, roasts, etc. which may be separately wrapped in conventional wrapping materials. It has been found that meat will retain a saleable red color for as long as ten days when covered with the cover herein described for the first seven days and with a conventional cover for the remaining three days. Of course, if desired, the final cuts rather than just the primal cuts may be individually wrapped in the cover such as shown in FIGS. 1 and 2, this cover preferably being replaced with a conventional cover by the retailer.

Figure 3:
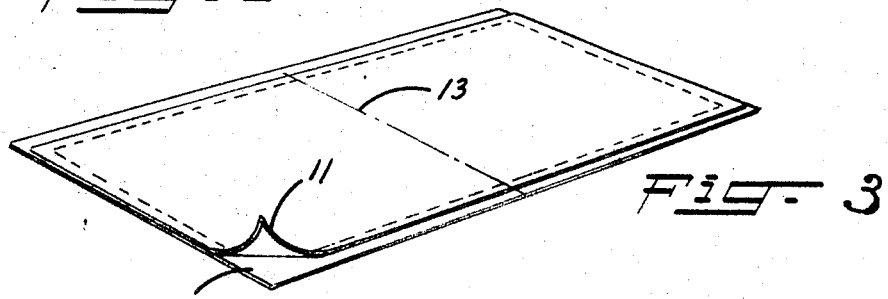
FIG. 3 is a perspective view of an alternative form of cover sheet which may be used to form a double-walled bag.
Figure 4:
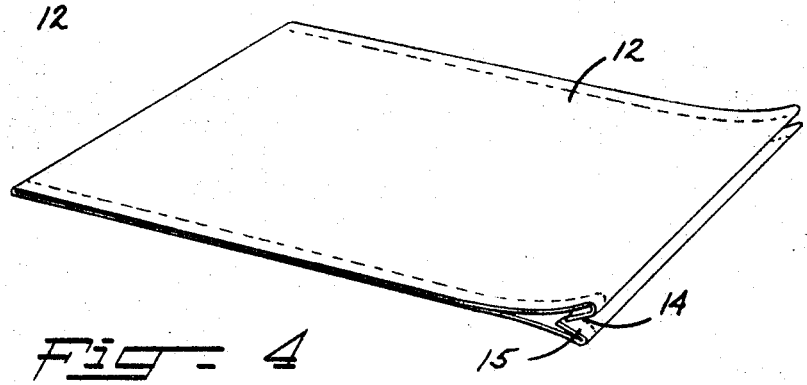
FIG. 4 is a perspective view showing the cover of FIG. 3 formed into a bag.

The alternative form of cover shown in FIGS. 3 and 4 comprises a sheet 11 coextensive in length with a sheet 12 but narrower than sheet 12. Sheet 11 is preferably similar to sheet 1, that is, cellophane coated on the side facing sheet 12 with polyethylene. Sheet 12 may be similar to sheet 2; saran coated with polyethylene on the side facing sheet 11. Sheets 11 and 12 are heat sealed together around the edges of sheet 11 and a supply of carbon monoxide is sealed therebetween. The composite sheet 11, 12 is folded about the center line 13 with sheet 11 facing inward and the extending side edges of sheet 12 are heat sealed together over most but not all of their length to form an open ended, double-walled bag as shown in FIG. 4. The sealed together ends of sheets 11 and 12 are folded inward as indicated at 14 and 15 so that the facing saran surfaces may be heat sealed together after freshly cut meat has been inserted into the bag. When the ends 14 and 15 are sealed, the immediately adjacent side edges of sheet 12 may be simultaneously sealed together to thus form a completely sealed bag. The bag shown in FIG. 4 is useful as a cover for individual cuts of meat and also for ground meat, i.e. hamburger, where color change normally takes place fairly rapidly.

It has been found that when freshly cut red meat is wrapped in the type of cover described above, as little as 0.08 cc. of carbon monoxide per square inch area is required to maintain the meat at a saleable red color for seven days. Thus, each individual cover need contain but a relatively small quantity of the gas and there is substantially no danger to the person using the same.

While the invention has been described with specific reference to a cover for treating meat, in its broader aspects it has utility in other areas. For example, various gases such as oxygen or nitrogen, high vapor pressure liquids such as cinnamaldehyde, methyl bromide and high vapor pressure solids such as paradichlorobenzene may be sealed within a pair of films such as described so as to safely confine the same until such time as it is desired to use them. Saran itself is permeable to certain vapors to which cellophane in the dry condition is impermeable. Thus, when paradichlorobenzene is sealed between the two films, film 2 is preferably cellophane coated at least on the outside with saran while film 1 is cellophane which is uncoated on the outside face.

Having thus described preferred embodiments of the invention, what is claimed is:

1. An article of manufacture comprising first and second films having sealed therebetween a supply of a material selected from the group consisting of gas, high vapor pressure liquid and a high vapor pressure solid, said films being substantially gas impermeable when dry, said first film being hydrophylic and becoming gas permeable when wetted, and said second film being hydrophobic and remaining substantially gas impermeable when wetted.

2. A cover for treating fresh red meat with carbon monoxide to produce carboxymyoglobin color comprising first and second exible films having a supply of carbon monoxide sealed therebetween, said films being substantially carbon monoxide impermeable when dry, said first film being hydrophylic and becoming carbon monoxide permeable when wetted by contact with the fresh meat, and said second film being hydrophobic and substantially carbon monoxide impermeable when wet as well as when dry.

3. The article set forth in claim 2 wherein said first film is a regenerated cellulose film.

4. The article set forth in claim 2 wherein said films form a double-walled bag with said first film constituting the inner wall.

5. The article set forth in claim 2 wherein said first film is a regenerated cellulose film having a polyethylene coating on one side, and second film is heat sealed to the polyethylene coated side of said first film around the edges of the films.

References Cited
UNITED STATES PATENTS

| | | | |
|---|---|---|---|
| 2,707,352 | 5/1955 | Fischer | 99—171 X |
| 3,122,748 | 2/1964 | Beebe | 99—157 X |

ROBERT W. JENKINS, Primary Examiner

U.S. Cl. X.R.

99—157; 206—46